Feb. 18, 1941.  A. H. MYLES  2,232,256

SYNCHRONIZING CONTROL SYSTEM

Filed July 16, 1938  2 Sheets-Sheet 1

INVENTOR.
ASA H. MYLES
BY John H. Leonard,
ATTORNEY.

Patented Feb. 18, 1941

2,232,256

UNITED STATES PATENT OFFICE 2,232,256

SYNCHRONIZING CONTROL SYSTEM

Asa H. Myles, Euclid, Ohio, assignor to The Electric Controller & Manufacturing Company, Cleveland, Ohio, a corporation of Ohio Application July 16, 1938, Serial No. 219,585

15 Claims. (Cl. 172—293)

This invention relates to electrical control systems and particularly to systems for controlling the synchronization of dynamo electric machines having their secondary windings electrically interconnected, such as are commonly referred to as "Selsyn" motors or "synchronous tie" motors.

If two or more asynchronous dynamo electric machines having their primary windings connected to a common source of power and their secondary windings electrically interconnected are properly synchronized, they will remain in synchronism, provided that the torque tending to hold them in synchronism is not exceeded. Motors connected in this manner are known as synchronous tie motors or more simply as tie motors, and the torque tending to hold them in synchronism is called the tie torque. The individual motors are referred to as transmitters or receivers depending upon whether the particular motor is transmitting or receiving torque at any given instant.

To insure a balanced load and to prevent excessive noise and vibration, it is necessary to excite large size tie motors with polyphase current. The use of polyphase current introduces certain operating difficulties not present when single phase excitation is used. For instance, polyphase tie motors have a tendency to accelerate to their induction motor speed whenever they are out of synchronism, so that special precautions must be taken in order to use them successfully.

In my co-pending application Serial No. 219,584 filed on the same date as this application, I have disclosed and claimed a control system for synchronizing a plurality of tie motors excited with polyphase current when each is mechanically coupled to a load driving motor which is to be maintained in synchronism with other load driving motors. However, in the adaptation of synchronous tie motors to various applications, the torque requirements are not always such as to justify the use of two load driving motors. Systems using but one driving motor and in which one of the tie motors itself drives a load directly are in operation, but no provision has heretofore been made for synchronizing the tie motors of such a system while they are rotating.

A control system capable of accomplishing such a result is useful in the operation of a system of conveyors of different sizes which must move in synchronism with each other, and in which the larger conveyors must run continuously while the smaller conveyors must be repeatedly started and stopped. Each of the smaller conveyors can be operated by a receiving one of the tie motors solely by virtue of the torque transmitted to the receiving one of the tie motors from a tie motor which is mechanically coupled to the driving motor of a larger conveyor.

Although the control system described in my prior mentioned application is adapted to synchronize two tie motors while they are rotating, it will only do so if the two tie motors are each mechanically coupled to driving motors of comparable torque output, the synchronization being obtained by opposing the torques of the tie motors as induction motors with the torques of the load driving motors, which opposition renders the system stable, but which causes a momentary change in the speed of the system. In the present invention, the system of control permits synchronization with no change in speed whatsoever.

An object of the present invention is to provide a control system for synchronizing two synchronous tie motors while they are rotating and without the necessity of having both tie motors mechanically coupled to load driving motors.

A further object of the invention is to provide a method and means for first accelerating one tie motor as a motor to bring it up to the speed of the other tie motor and then for synchronizing it with the other tie motor without changing the speed of the latter.

In order to connect the secondary windings of two identical and rotating tie motors together without tending to cause continued pulsation of peak currents, it is absolutely essential that the respective speeds of the tie motors and consequently the respective induced voltages of the secondary windings be substantially equal. It is also necessary that the speeds of the rotors of the two tie motors be substantially equal or the rotors close to a synchronous position in order for them to be pulled into synchronism when the secondary windings are electrically interconnected. Since the frequency and magnitude of the induced voltage in the secondary of the tie motors are inversely proportional to the rotor speed, a means for connecting the windings together when the respective frequencies and voltages are substantially equal will assist in accomplishing the desired result. It was found that ordinary speed responsive or frequency responsive relays are not satisfactory for this purpose because they are not accurate and fast enough in response to the condition.

The present invention has for one of its objects the provision of a series-parallel resonant relay circuit which provides the necessary accuracy for obtaining the proper switching sequence.

A correlative object is to provide a frequency and voltage responsive relay circuit which is accurate enough and fast enough to synchronize two co-rotating tie motors.

Other objects and advantages will become apparent from the following specification wherein reference is made to the drawings in which.

In the drawings, like numerals of reference indicate corresponding parts in the different figures.

Since the receiving tie motor is designed to drive its associated load by means of the torque transmitted to it from the transmitter, it is necessary to operate the tie motors in the direction of their rotating magnetic fields in order for it to be possible to bring the receiver up to speed as an induction motor. Advantage is thus taken of polyphase excitation of the tie motors to provide a convenient means to accelerate one of them to the proper speed.

When synchronous tie motors are rotating in the direction of their rotating magnetic fields, the torque-speed characteristic has an undesirable feature in that, as the tie motors approach synchronous speed, the tie torque approaches zero. However, if the tie motors are operated at less than their induction motor speed, a tie torque sufficient for most purposes is available. Therefore, the transmitter of the two tie motors is arranged to be driven at somewhat less than its induction motor speed in the same direction as its rotating magnetic field by the associated driving motor when the driving motor is operating at its normal speed. Also, the receiver is accelerated as an induction motor and maintained at less than its induction motor speed by extra resistance inserted in the rotor circuit. Consequently, to synchronize the tie motors when they are rotating, their secondary windings are interconnected at the instant when their speeds are equal. Also, the extra resistance in the rotor circuit of the receiver is disconnected and at the same time polyphase excitation is removed from the primaries of the two tie motors and single phase excitation retained to insure that the two motors will synchronize. Subsequently, polyphase power may again be supplied to the primary windings and the synchronous condition will be maintained.

Figure 1:
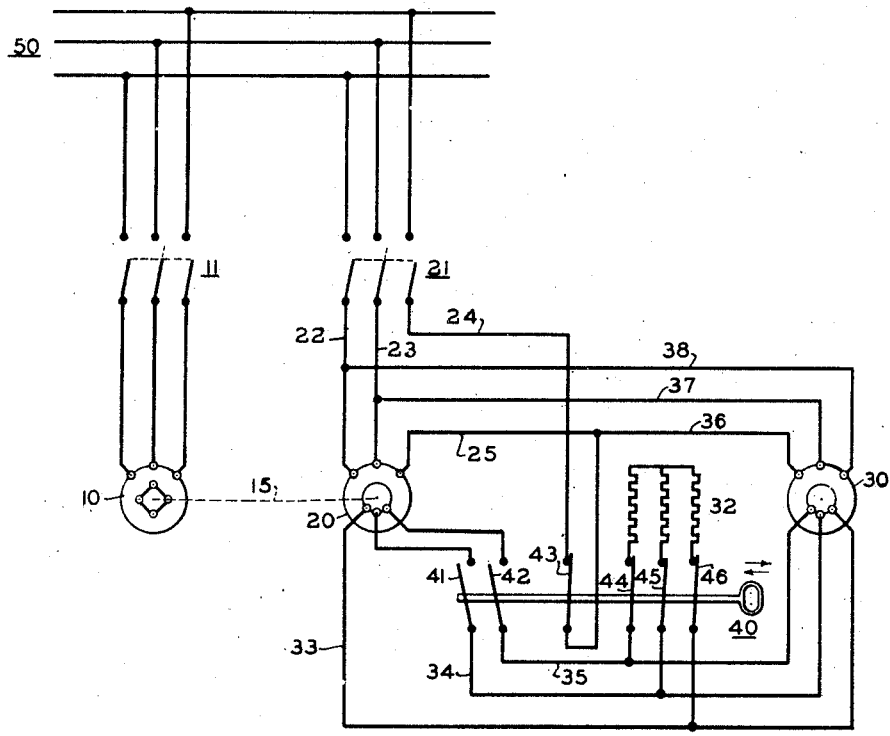
Fig. 1 is a diagrammatic illustration of the system of the present invention.

In Fig. 1, a load driving motor 10 is mechanically coupled to a synchronous tie motor 20 by a means illustrated as a shaft 15.

Although the motor 10 is shown as a squirrel cage motor, it may be of any type, but preferably has a normal operating speed somewhat less than the induction motor speed of the tie motor 20. A knife switch 11 is provided to connect the motor 10 to a source of polyphase power represented by the conductors 50.

The synchronous tie motor 20 operates as a transmitter, and a synchronous tie motor 30 operates as a receiver and drives a load (not shown) in synchronism with the load (not shown) driven by the motor 10. The tie motors 20 and 30 preferably should be of the same size and type and should be able to transmit and receive sufficient torque to drive the load connected to the tie motor 30. A knife switch 21 is provided to connect the primary windings of the tie motors 20 and 30 to the source of power 50. A two position knife switch 40 having contacts 43, 44, 45 and 46 normally closed and contacts 41 and 42 normally open makes the various connections necessary to synchronize the tie motor 30 with the tie motor 20 while the two motors are rotating. The acceleration of the tie motor 30 is controlled by a resistance section 32.

In operating the schematic showing of Fig. 1, the switch 11 is first closed to connect the motor 10 to the source of power 50. The motor 10 then accelerates to its normal speed and drives the tie motor 20 at a speed substantially less than its induction motor speed. These speed relations can, for example, be obtained by the use of gearing or by designing the motors for different synchronous speeds. In order to accelerate the tie motor 30 so as to bring it up to the speed at which the tie motor 20 is being driven, the knife switch 21 is closed. This connects the primary winding of the tie motor 20 to the source 50 through the conductors 22, and 23 directly, and through the conductor 24 to the normally-closed contact 43 of the knife switch 50 and thence through a conductor 25 to the primary winding. The phase relationship of the currents in the conductors 22, 23 and 24 is such that the energization of the primary winding of the tie motor 20 sets up a rotating magnetic field which is rotating in the same direction in which the rotor of the tie motor 20 is being rotated by means of the motor 10. Because of the fact that the rotor of the tie motor 20 is open circuited, as by means of the open contacts 41 and 42 of the knife switch 40, the excitation of its primary winding has no effect at this time. The closure of the knife switch 21 also completes a circuit from the source 50 to the primary winding of the tie motor 30, one terminal being connected through the conductors 22 and 36, another through the conductors 23 and 37, and the third through the conductor 24, the closed contact 43 of the knife switch 40, and a conductor 38.

Since the rotor winding of the tie motor 30 is in a closed circuit with the resistance 32 through the closed contacts 44, 45 and 46 of the knife switch 50, the tie motor 30 is accelerated as an induction motor. At the instant when the speeds of the two tie motors are equal, the knife switch 40 may be operated to disconnect the resistance 32 by means of the contacts 44, 45 and 46, to remove polyphase excitation from the primary windings of the tie motor by means of the contact 43, and to interconnect the two rotor windings of the tie motors 20 and 30 by means of the contacts 41 and 42. Since the tie motors 20 and 30 are operating at the same speed, and since polyphase excitation is removed from the primaries, the tie motors 20 and 30 are pulled into step with no resulting current peaks and will continue to operate in synchronism. If the polyphase excitation were not removed, there would be a tendency for the tie motor 30 to accelerate to full speed. If the rotors of the two tie motors are by chance in the proper position and rotating at the proper speed when the knife switch 40 is operated, they will synchronize even though excited with polyphase current. However, such operation is not uniform and it has been found necessary in practice to remove the polyphase excitation and supply single phase excitation until the motors synchronize.

The description of the schematic showing of Fig. 1 has assumed that it would be possible to always operate the knife switch 40 at the proper time. As a practical matter, this would not be feasible and an automatic method must be provided in order to insure uniform and satisfactory operation.

Figure 2:
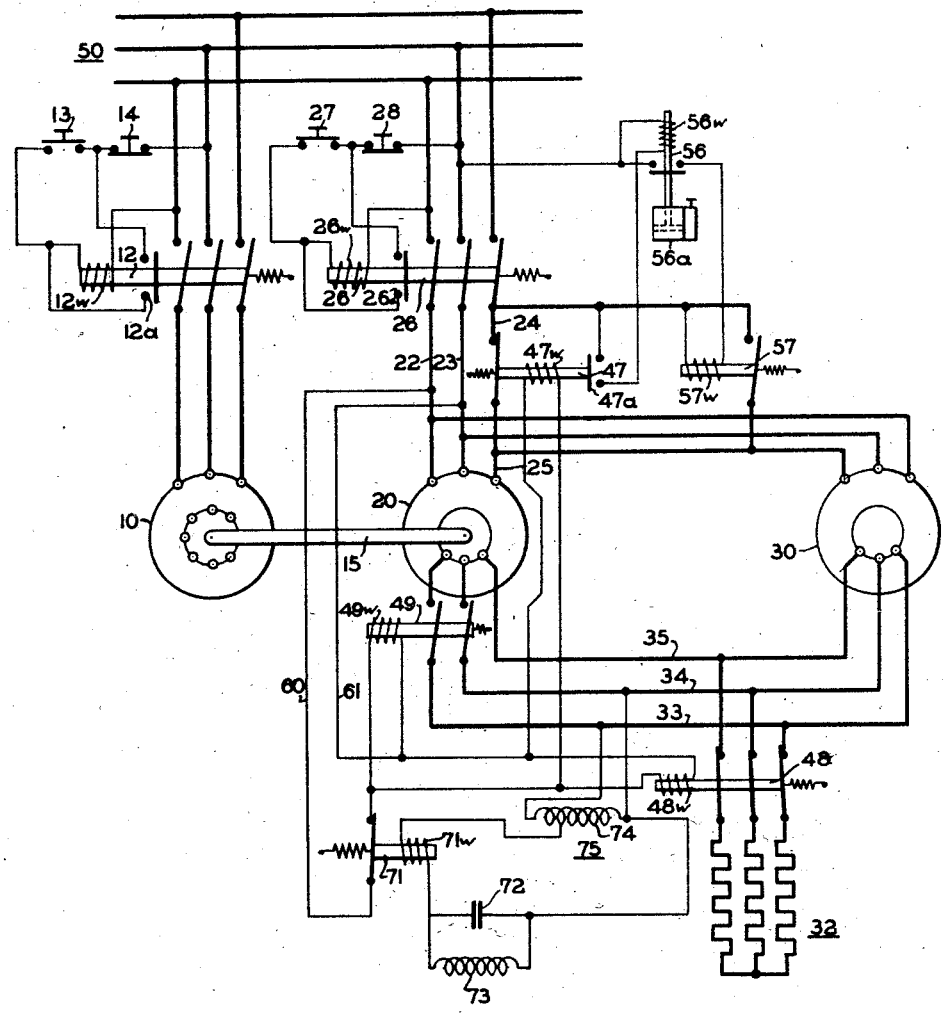
Fig. 2 is a wiring diagram showing the application of a method of automatic operation of the switching sequence disclosed in Fig. 1.

In Fig. 2 an automatic system for accomplishing the same results as outlined in connection with Fig. 1 is shown. In Fig. 2 an electromagnetic contactor 12 having an operating winding 12w and an auxiliary contact 12a is arranged to connect the squirrel cage motor 10 to the source 50. The operation of the contactor 12 may be controlled by means of the two push buttons 13 and 14.

The transmitter 20 is driven by the motor 10 by means of the shaft 15 so that the two machines will be rotated in unison. An electromagnetic contactor 26 having an operating winding 26w and an auxiliary contact 26a is arranged to connect the primary winding of the transmitter 20 and the primary winding of the receiver 30 to the polyphase source 50 when a normally closed contactor 47 is in the closed position. The operation of the contactor 26 may be controlled by means of the push buttons 27 and 28.

The resistance 32 is arranged to be connected across the secondary winding of the receiver 30 by means of a normally closed electromagnetic contactor 48 having an operating winding 48w. The contacts of the contactor 48 are held in a normally closed position by means of a spring, and are opened upon energization of the operating winding 48w. An electromagnetic contactor 49 having an operating winding 49w is arranged to interconnect any two conductors, shown as conductors 33 and 34, of the three conductors 33, 34 and 35 provided for interconnecting the secondary windings of the two tie motors.

In order to provide for removal of polyphase excitation at the instant of synchronization, the electromagnetic contactor 47 having an operating winding 47w and an auxiliary contact 47a is arranged to operate simultaneously with the contactors 48 and 49 and to open one of the conductors, shown as conductor 24, leading from the contactor 26 to the primaries of the two tie motors 20 and 30.

To insure that the contactors 47, 48 and 49 operate simultaneously, their respective operating windings 47w, 48w and 49w are connected in parallel across a single phase of the source of power. A single contactor having a number of normally closed and normally open contacts could also be used instead of the three separate contactors 47, 48 and 49.

It is essential, in order to insure synchronization of the tie motors 20 and 30, that the contactors 47, 48 and 49 operate at the instant when the speeds of the two tie motors are equal so as to prevent continued peak currents and to permit the synchronizing torque to pull the rotors of the two tie motors into step regardless of the phase position of the rotors. Ordinary speed responsive switches or frequency relays are not accurate nor fast enough for this purpose. The series resonant relay circuit described and claimed in a co-pending application of John D. Leitch, Serial No. 168,760, filed October 13, 1937, was employed and gave satisfactory operation. This relay circuit comprises a resistance and condenser connected in series with the relay operating coil. When connected to a circuit having a declining frequency and decreasing voltage, such as the secondary winding of an alternating current motor during acceleration, the relay responds at definite values of voltage and frequency.

However, it was found that a higher initial relay current and a sharper cut-off than was obtainable by using series resonance alone would be desirable. As will be observed, the relay operating winding must be energized and the relay contacts opened when a 60-cycle current, assuming a 60-cycle source, flows in the rotor of the tie motor 30. The relay operating winding must become deenergized at some frequency less than that of the line frequency, for instance, at 30 cycles. This means that the current in the relay at 60 cycles must be considerably higher than the current flowing in the relay at exactly 30 cycles.

Figure 3:
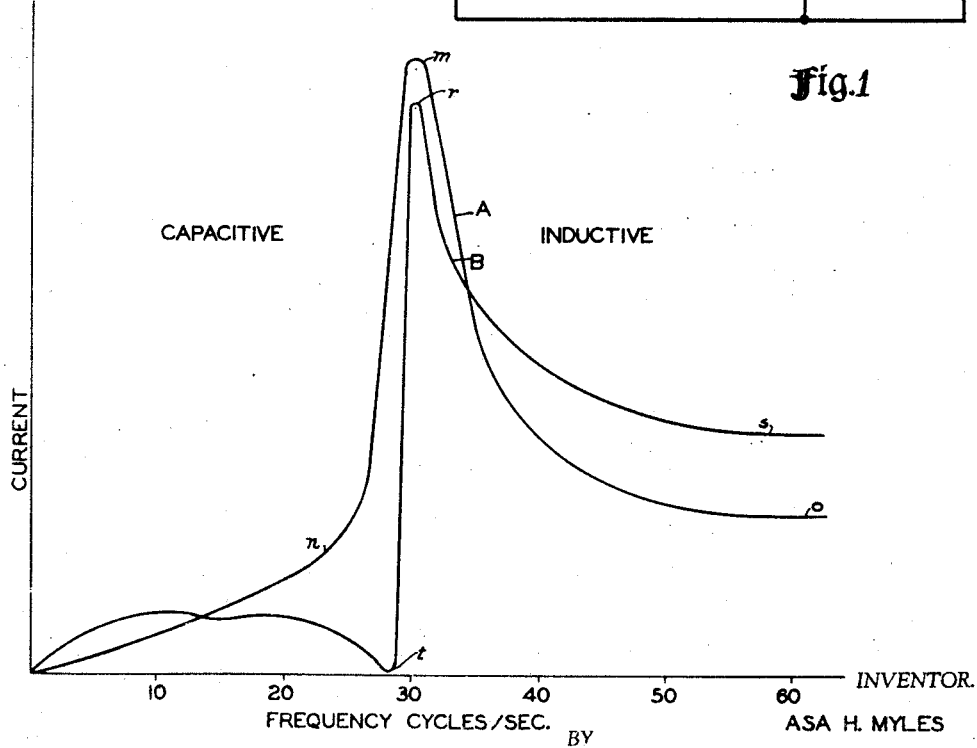
Fig. 3 is a graph showing comparative frequency and voltage response curves of two types of resonant relay circuits which may be used.

Referring to Fig. 3, curve A shows a typical current-frequency response curve for a series resonant circuit under conditions of varying voltage and frequency wherein the voltage varies directly as the frequency, as is true in the secondary windings of all alternating current motors during acceleration. It will be noted that the slope of the curve on the capacitive side of the resonance point $m$ slopes gradually over a wide range of frequencies to the deenergizing point $n$. It is true that by lowering the resistance of such a relay circuit, the slope of this portion of the curve could be made much steeper, but from a practical standpoint of relay coil design this is impossible. It will also be noted that the portion $o$ of the curve A in the higher frequency ranges is not much higher than the point $n$. It is obvious from the curve A that the current at the point $n$ must be as high as possible to obtain a definite cut-off and also that the current at point $n$ cannot be higher than the current at point $o$. Therefore, the current in the relay circuit at pick-up cannot be much greater than at drop-out, which tends to cause erratic operation under some conditions.

The series resonant circuit just described gives minimum impedance at resonance for a fixed total resistance, and, as is well known, parallel resonance gives maximum impedance at resonance for a fixed total inductance. This difference between the impedance of a series circuit and of a parallel circuit at resonance is of great importance in radio, as by its use it is possible to tune a radio receiver so that it will respond to a definite frequency and at the same time suppress an undesirable frequency.

Because of the inherent high resistance of the operating winding of a relay sensitive enough to respond to variations in the electrical condition of the secondary windings of alternating current motors, the drop in the current-frequency curve on the capacitive side of resonance in a series resonant circuit cannot be made steep enough for all purposes in the region of current values below the current values on the inductive side which must cause energization of the relay. A series-parallel resonant circuit tuned to give series resonance at, for instance, 30 cycles, and parallel resonance at 28 or 29 cycles, was found to give a steeper drop in current in the desired region than had heretofore been obtainable. Furthermore, because of the fact that not only was the frequency varying but also the voltage, it was found that the current on the inductive side of the resonance point remained at an extremely high value, thus avoiding the erratic operation which sometimes occurred when a series resonant circuit alone was used.

To provide a more accurate relay response, the applicant devised the relay circuit indicated by 75 in Fig. 2. This circuit is described and claimed in my copending application Serial No. 266,623, filed April 7, 1939, and comprises an auto transformer 74 connected across two conductors 33 and 34 leading from the rotor winding of the tie motor 30. Connected to the secondary portion of the auto transformer 74 is a relay winding 71w of a relay 71 and in series therewith a resonant circuit including a condenser 72 and an inductance 73. The series-parallel resonant circuit 75 may be connected so as to be responsive to the electrical condition of the rotor winding other than by means of the transformer 74, as for instance, by direct connection across a portion of the resistance 32.

The frequency response curve under conditions of varying voltage for this relay circuit is illustrated by curve B of Fig. 3. It will be noted that the capacitive side of the resonance point r of the curve B is extremely steep and drops from a maximum value to a minimum value within 2 cycles. The portion s of the curve B is much higher than the portion o of the curve A and a great deal higher than the point t of curve B. Thus the relay winding 71w is strongly energized when the tie motor 30 is first connected to the source of supply and remains strongly energized until the speed of the tie motor 30 reaches a very definite point, at which instant the current in the relay drops to almost zero, causing a rapid closing of its contacts and consequent energization of the windings 47w, 48w and 49w. The portion of the curve B in the lower frequency range shows that, after deenergization of the winding 71w, the current in the relay circuit tends to increase again. However, this increase is too slight to cause operation of the relay, but may be eliminated entirely by connecting the relay circuit 75 to the rotor circuit at some point on the resistance 32 or between the resistance 32 and the contactor 48.

After the two tie motors 20 and 30 have been synchronized, it may be desirable to again excite their primary windings with polyphase power. A contactor 57 having an operating winding 57w is provided for this purpose. The operation of the contactor 57 is controlled by a time delay relay 56 having an operating winding 56w and a time delay means, shown as a dash pot 56a, for delaying the closure of the contacts of the relay 56 for an interval after the energization of the winding 56w. The winding 56w is energized through the auxiliary contacts 47a of the contactor 47 when the contactor 47 is in the energized position.

The control system shown in Fig. 2 operates as follows:

Closure of the push button 13 completes an obvious circuit from one phase of the source 50 to the operating winding 12w of the contactor 12, which thereupon closes its contacts to connect the motor 10 to the source 50. The push button 13 may then be released and the winding 12w will remain energized through the normally-closed contacts of the push button 14 and the now closed auxiliary contacts 12a of the contactor 12. To stop the motor 10, it is only necessary to operate the push button 14 to deenergize the operating winding 12w.

While the motor 10 is rotating, the push button 27 may be operated to energize over an obvious circuit the winding 26w of the contactor 26. The contactor 26 when closed, due to energization of its operating winding 26w, will remain in the closed position due to maintenance of a circuit through the winding 26w by means of the normally-closed push button 28 and the now closed contacts 26a. Immediately after the closure of the contactor 26, the tie motor 30 will accelerate as an induction motor, and will approach a predetermined percentage of its induction motor speed determined by the inclusion of the resistance 32 in its secondary circuit. The relay circuit 75 will be energized in accordance with the electrical condition of the rotor circuit of the tie motor 30 since it is connected thereto through the transformer 74. The electrical characteristics of the relay circuit 75 are such as to cause immediate and positive energization of the operating winding 71w at the instant when the primary winding of the tie motor 30 is initially energized. Energization of the operating winding 71w results in the opening of the contacts of the relay 71. Thus no circuit is completed at this time to the operating windings 47w, 48w and 49w, even though the conductors 60 and 61 are connected to the now energized conductors 22 and 23, respectively.

Since the speed of the tie motor 20 is known, the values of inductance and capacitance of the relay circuit 75 may be adjusted so that the relay 71 will close its contacts at a predetermined value of the frequency of the induced current in the rotor of the tie motor 30 so that the interconnection will be made when the speeds of the two tie motors are substantially equal. Consequently, when the tie motor 30 reaches the desired speed, the coil 71w will be deenergized, and in response thereto the relay 71 will close its contacts to energize the operating windings 47w, 48w and 49w.

The phenomenon of series-parallel resonance thus causes a large current to flow in the operating winding 71w when the primary of the tie motor 30 is first energized and causes a steep drop in the current when the speed of the tie motor 30 reaches a predetermined value.

The energization of the operating winding 48w results in the opening of the contacts of the contactor 48 disconnecting the resistance 32 from the interconnecting secondary conductors 33, 34 and 35. The contactor 49 in response to the energization of its operating winding 49w closes its contacts to complete the interconnection of the rotor windings of the two tie motors. The contactor 47 in response to the energization of its operating winding 47w opens its main contacts to remove polyphase excitation from the primary windings of the two tie motors. Since the secondary windings of the tie motors are now interconnected and the resistance 32 disconnected and polyphase excitation removed, there is no longer any tendency for motor action, but there is present only a synchronizing torque tending to pull the machines into a synchronous position and to maintain them in that position.

The energization of the winding 47w of the contactor 47 causes the closure of the contacts 47a to complete a circuit to the operating winding 56w of the time delay relay 56. After a time delay occasioned by the dash pot 56a, the contacts of the relay 56 close to complete a circuit to the winding 57w of the contactor 57. The contactor 57 in response to the energization of its operating winding 57w closes its contacts to reapply polyphase power to the primaries of the tie motors. Since the tie motors have become synchronized, the addition of polyphase power merely increases the value of the tie torque.

Any of the several types of brakes may be employed to bring the tie motor 30 to rest after deenergization is accomplished by operation of the push button 28, which when operated deenergizes the winding 26w of the contactor 26. Opening of the contactor 26 in response to deenergization of its winding 26w removes all excitation from the primary windings of both tie motors 20 and 30 and also deenergizes the windings 48w and 49w.

The contactor 48 in response to deenergization of its operating winding 48w closes its contacts to reconnect the resistance section 32 in the rotor winding of the tie motor 30. The contactor 49 in response to deenergization of its operating winding 49w opens its contacts to disconnect the secondary windings of the tie motors 20 and 30.

If it is desired to stop the main motor 10, the push button 14 may be operated to deenergize the winding 12w of the contactor 12 which will open its contacts to remove power from the motor 10.

Having thus described my invention, I claim:

1. In a synchronizing system, a pair of dynamo-electric machines each having a pair of inductively related windings, extraneous means to rotate one of said machines, means for connecting a winding of each machine to a polyphase source of power, the connection to the source of power of a winding of the machine which is not being extraneously driven causing said machine to accelerate as an induction motor, and means for electrically interconnecting the other windings of each machine when the machines are rotating at substantially the same speed and for concurrently disconnecting one terminal of each of said windings connected to said polyphase source from said source, whereby the windings are partially energized by single phase current and the machines synchronized.

2. In a synchronizing system, a pair of dynamo-electric machines each having a pair of inductively related windings, extraneous means to rotate one of said machines, means for connecting a winding of each machine to a polyphase source of power, the connection to the source of power of a winding of the machine which is not being extraneously driven causing said machine to accelerate as an induction motor, and speed responsive means for electrically interconnecting the other windings of each machine and for concurrently disconnecting one terminal of each of said windings connected to said polyphase source from said source, whereby the windings are partially energized by single phase current and the machines synchronized.

3. In a synchronizing system, a pair of dynamo-electric machines each having a primary and a secondary winding, means for connecting the primary winding of each machine to a polyphase source of power, extraneous means to rotate one of said secondary windings, the extraneously rotated secondary winding being open circuited whereby the connection of its associated primary winding to the polyphase source of power has no effect thereon, and the other secondary winding being closed circuited whereby the connection of its associated primary winding to the source of power causes said machine to accelerate as an induction motor, and means operable when the machines are rotating at substantially the same speed for open circuiting said closed circuited secondary winding, for concurrently electrically interconnecting the secondary windings, and for concurrently disconnecting one terminal of each of the primary windings from the polyphase source, whereby the primary windings are partially energized by single phase current and the machines synchronized.

4. In a synchronizing system, a pair of dynamo-electric machines each having a primary and a secondary winding, means for connecting the primary winding of each machine to a polyphase source of power, extraneous means to rotate one of said machines, the secondary winding of the machine which is being extraneously driven being open circuited whereby the connection of its associated primary winding to the polyphase source of power has no effect thereon, and the other secondary winding being closed circuited whereby the connection of its associated primary winding to the source causes said machine to accelerate as an induction motor, means responsive to the electrical condition of a winding of the machine operating as a motor for open circuiting said closed circuited secondary winding, for concurrently electrically interconnecting the secondary windings of each machine, and for concurrently disconnecting one terminal of each of the primary windings from the polyphase source, whereby the primary windings are partially energized by single phase current and the machines synchronized.

5. In a motor synchronizing system, a pair of dynamo-electric machines each having a primary and a secondary winding, means for connecting the primary winding of each machine to a polyphase source of power causing a rotating magnetic field to be set up in each machine, extraneous means to rotate one of said secondary windings in the direction of its associated rotating magnetic field, the extraneously rotated secondary winding being open circuited whereby the connection of its associated primary winding to the polyphase source of power has no effect thereon, and the other secondary winding being closed circuited whereby the connection of its associated primary winding to the source causes said winding to accelerate in the direction of the rotating magnetic field, means operable when the speeds of the two machines are substantially equal for open circuiting said closed circuited secondary winding, for concurrently electrically interconnecting the secondary windings of each machine, and for concurrently disconnecting one terminal of each of the primary windings from the polyphase source.

6. In a synchronizing system, a pair of dynamo-electric machines each having a pair of inductively related windings, extraneous means to rotate one of said machines at a speed less than its normal motor speed, means for connecting a winding of each machine to a polyphase source of power, the connection to the source of power of a winding of the machine which is not being extraneously driven causing said machine to accelerate as an induction motor, means for preventing the machine which is accelerated as an induction motor from reaching its induction motor speed, and speed responsive means for electrically interconnecting the other windings of each machine when the machines are rotating at substantially the same speed and for concurrently disconnecting one terminal of each of said windings connected to said polyphase source from said source, whereby the windings are partially energized by single phase current and the two machines synchronized.

7. The method of synchronizing two co-rotating, polyphase excited, wound rotor induction motors which consists in extraneously rotating one motor in the direction of its rotating magnetic field with its secondary winding open circuited, accelerating the other motor by closing its secondary circuit through a resistance, electrically interconnecting the two secondary windings when the motors are rotating at substantially the same speed, concurrently disconnecting said resistance, and concurrently removing said polyphase excitation and applying single phase excitation.

8. The method of synchronizing two co-rotating, polyphase excited, wound rotor induction motors which consists in extraneously rotating one motor in the direction of its rotating magnetic field with its secondary winding open circuited, accelerating the other motor by closing its secondary circuit through a resistance, electrically interconnecting the two secondary windings when the motors are rotating at substantially the same speed, concurrently disconnecting said resistance, concurrently removing said polyphase excitation and applying single phase excitation, and subsequently reapplying polyphase excitation.

9. The method of synchronizing two co-rotating, polyphase excited, wound rotor induction motors which consists in extraneously rotating one motor in the direction of its rotating magnetic field with its secondary winding open circuited, accelerating the other motor as an induction motor, electrically interconnecting the two secondary windings when the motors are rotating at substantially the same speed, concurrently removing said polyphase excitation and applying single phase excitation, and subsequently reapplying polyphase excitation.

10. The method of synchronizing two co-rotating, polyphase excited, wound rotor induction motors which consists in extraneously rotating one motor in the direction of its rotating magnetic field at a speed less than its induction motor speed, accelerating the other motor by closing its secondary circuit through a resistance, electrically interconnecting the two secondary windings when the motors are rotating at substantially the same speed, concurrently disconnecting the resistance, and concurrently removing said polyphase excitation and applying single phase excitation.

11. A synchronizing system as defined in claim 4 in which the said means responsive to the electrical condition of a winding comprises an electrically resonant circuit connected to the said winding of the machine which is operating as a motor, and switch means operated by said electrically resonant circuit.

12. A synchronizing system as defined in claim 4 in which the means responsive to the electrical condition of a winding comprises a series-parallel resonant circuit connected to the said winding of the machine which is operating as a motor, and switch means operated by said electrically resonant circuit.

13. The combination with a pair of independently rotatable dynamo electric machines each having inductively related primary and secondary windings and adapted to be operated as synchronous-tie motors, means for connecting said primary windings to a source of alternating current, and means for causing concurrent rotation of the machines, of connecting means operable for electrically interconnecting the secondary windings of said machines while said machines are rotating, and means operable in response to the speed of one of said machines when both are rotating to effect operation of said connecting means whereby the machines may be synchronized automatically while they are rotating.

14. The combination with a pair of dynamo-electric machines each having inductively related primary and secondary windings, means for connecting said primary windings to a source of polyphase power, extraneous means for rotating one of said machines while its secondary winding is open-circuited, and means operable to complete the secondary circuit of the other of said machines whereby the other of said machines accelerates as a polyphase induction motor, of switching means operable for rendering the last mentioned means inoperable and for concurrently electrically interconnecting the secondary windings of each machine, and means responsive to the speed of the said other of said machines to effect said operation of said switching means while both of said machines are rotating.

15. In a synchronizing system, a pair of dynamo-electric machines each having a pair of inductively related windings, extraneous means for rotating one of said machines, means for connecting the primary winding of each machine to a source of polyphase power, the connection to the source of power of the primary winding of the machine which is not being extraneously driven causing said machine to accelerate as an induction motor, means operative to electrically interconnect the secondary windings of each machine when the machines are rotating at substantially the same speed, concurrently to disconnect the source of polyphase power from the primary windings, and concurrently to connect the primary windings to but one phase of said source, whereby the windings are partially energized by single phase current and the machines synchronized, and time delay means operative a predetermined time after the operation of said last named means to again connect the primary windings to the source of polyphase power.

ASA H. MYLES.